(No Model.)
J. A. W. BURRIS.
HOPPLE.
No. 373,173. Patented Nov. 15, 1887.
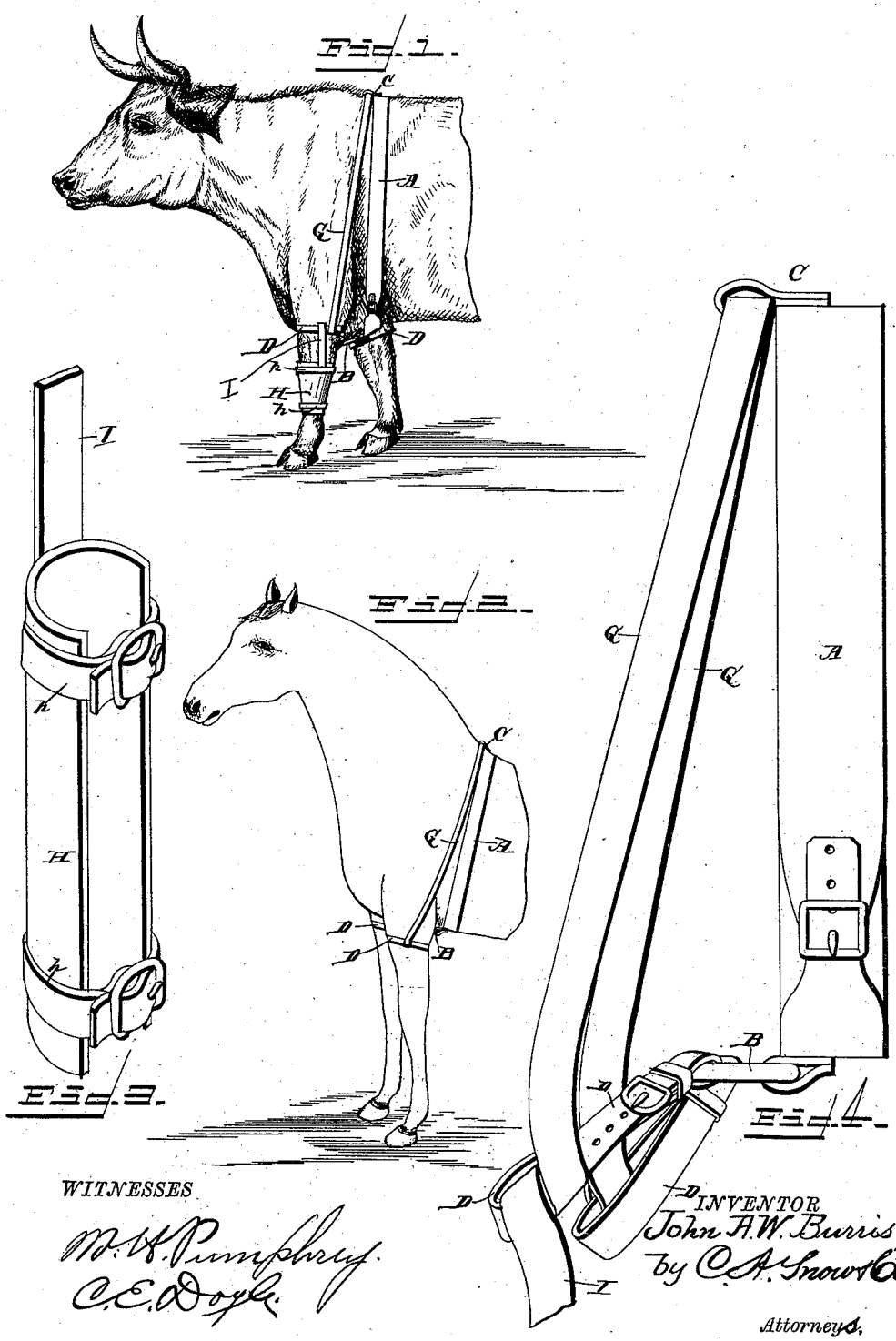
WITNESSES
INVENTOR
John A. W. Burris
by C. A. Snow & Co.
Attorneys

UNITED STATES PATENT OFFICE.

JOHN ALBERT WILSON BURRIS, OF DEPORT, TEXAS.

HOPPLE.

SPECIFICATION forming part of Letters Patent No. 373,173, dated November 15, 1887.

Application filed August 9, 1887. Serial No. 246,526. (No model.)

*To all whom it may concern:*

Be it known that I, JOHN ALBERT WILSON BURRIS, a citizen of the United States, residing at Deport, in the county of Lamar and State of Texas, have invented new and useful Improvements in Hopples for Cows, Horses, and other Animals, of which the following is a specification.

My invention relates to improvements in hopples for horses, cows, and other animals which are apt to stray or become unruly; and it consists in a certain novel construction and arrangement of parts, fully set forth hereinafter, and specifically pointed out in the claims.

In the drawings, Figure 1 shows the device applied in the operative position to a cow. Fig. 2 is a view of the device as seen when applied to a horse, with the knee-band removed. Fig. 3 is an enlarged side view of the hopple, and Fig. 4 is a detail perspective view of the knee-band.

Referring by letter to the drawings, A designates the ordinary surcingle, which is passed around the body of the horse or cow in the ordinary manner, to the lower portion of which, under the center of the body, is attached the ring B, and C designates a loop attach to the surcingle on the back of the animal.

D D are bands or straps, passing through the ring B and around the fore legs, respectively, of the animal, the said straps being provided with buckles to enable them to be drawn tight.

G designates a strap secured at the ends, respectively, in the bands D D, and passing at the center through the loop C on the upper part of the surcingle. It will be seen that this strap G passes around the body of the animal, and thus supports the bands D D and prevents their slipping out of place while the animal is in motion.

This constitutes the fetter or hopple as applied to horses, and it will be observed that it is extremely simple. In this device the bands which are secured around the fore legs of the horse are not secured together, as in the ordinary hopple, but are both secured to the ring, which is in turn rigidly and strongly secured to the surcingle. When the bands which are secured to the legs of the horse are attached together, the effort of the horse to step forward tends to draw the stationary leg forward also, and this has a tendency to gall the said stationary leg and render the animal irritable. In my device the surcingle is rigidly and tightly secured around the body of the horse, and the bands which encompass the legs of the same are secured to the same, so that when the horse makes an effort to step too far the leg is stopped by a direct pull backward. There is no fetter to the backward motion of the leg, but simply to the forward motion, and the motion of one leg does not affect the other. Further, when the bands are secured to the legs and attached together, they must be drawn very tight to prevent their slipping down; but by attaching them to the surcingle they are supported. I also provide additional means of support in the strap G, which is secured at the ends to the leg-bands and is passed over the body of the horse. Thus the said leg-bands need not be drawn tight, but may be allowed to remain loose, and thus there will be no possibility of galling.

This device, as herein described, is adapted, also, to be applied to cows, to prevent them from straying. Cows having milking calves are very apt not only to stray from them, but to remain away when the calves should have feed; and to prevent this I attach a short strap, I, to one of the leg-bands, and extend it down the leg of the cow, and secure it at the lower end to a knee-band, H, which comprises a stout piece of harness or sole leather provided with short tightening-straps $h\ h$, and the said band is passed around the knee of the cow and secured tightly in place. It extends above and below the knee a considerable distance, and is supported by the strap I. It will be readily seen that the cow cannot bend her knee, and therefore cannot lie down, and consequently, after having stood all day, she will come home in the evening to be milked, and then the knee-band is removed to allow her to rest. The band is replaced, as before, in the morning, and she will return in the evening, as before, and thus in a short time she will acquire the habit of returning regularly to be milked.

This device, as will be seen, is very simple;

but it is also very effective, and it will be found that by means of the same very unruly cattle may be controlled without the slightest trouble, as the restraint put upon them by the fetter or hopple will occupy their attention and render them docile.

Horses are prevented from rearing and jumping, and therefore there is no danger of their escaping from a fenced field, and in breaking a horse or mule or other draft-animal to harness or a saddle this fetter will be found of great use.

Having thus described my invention, I claim—

1. The combination of the surcingle A, having the ring B movably secured at the lower central portion thereof and the loop C stationarily secured to the top central portion thereof, the leg-bands D D, secured in the movable ring B, and the supporting-strap G, passed through and movable in the loop C, in direct connection with the central top portion of the surcingle, and connected at its ends to the leg-bands D, whereby a cramping effect is avoided, substantially as described.

2. The combination of the surcingle A, having the ring B secured thereto at the bottom and the loop C secured thereto at the top, the bands D D, secured in the ring B, the supporting-strap G, secured at the ends to the said bands D D and passing at the center through the loop C, the knee-bands H, constructed of stiff leather in semi-cylindrical form, and the supporting-straps I, attached at their ends to one of the bands D and to one of the knee-bands H, substantially as specified.

3. The combination of the surcingle, the bands D D, connected to the bottom thereof, the supporting-straps I, secured to one of said bands, and the knee-bands H, constructed of stiff leather in semi-cylindrical form, attached to said straps I, and having the securing-straps $h\ h$, substantially as described.

In testimony that I claim the foregoing as my own I have hereto affixed my signature in presence of two witnesses.

JOHN ALBERT WILSON BURRIS.

Witnesses:
JNO. T. PHILLIPS,
C. G. HANCOCK.